United States Patent
Menzio

(12) 
(10) Patent No.: US 6,648,806 B2
(45) Date of Patent: Nov. 18, 2003

(54) DEVICE FOR LOADING AND UNLOADING TOOLS INTO/FROM THE TOOL MAGAZINE OF A MACHINE-TOOL

(75) Inventor: Danilo Menzio, Grugliasco (IT)

(73) Assignee: Comau SpA, Grugliasco (IT)

( * ) Notice: Subject to any disclaimer, the term of this patent is extended or adjusted under 35 U.S.C. 154(b) by 0 days.

(21) Appl. No.: 10/238,596

(22) Filed: Sep. 11, 2002

(65) Prior Publication Data

US 2003/0050158 A1 Mar. 13, 2003

(30) Foreign Application Priority Data

Sep. 11, 2001 (IT) ..................................... TO2001A0865

(51) Int. Cl.⁷ .............................................. B23Q 11/08
(52) U.S. Cl. ............................... 483/3; 483/14; 483/25; 483/61; 414/273
(58) Field of Search ................................. 483/3, 39, 64, 483/58, 69, 60, 61, 67, 37, 14, 25; 414/273

(56) References Cited

U.S. PATENT DOCUMENTS

| | | | | | |
|---|---|---|---|---|---|
| 4,563,120 A | * | 1/1986 | Josserand | .................... | 414/273 |
| 4,837,918 A | * | 6/1989 | Holy et al. | .................... | 483/25 |
| 4,943,199 A | * | 7/1990 | Hillen | .......................... | 483/61 |
| 5,281,194 A | * | 1/1994 | Schneider | .................... | 483/14 |
| 6,077,206 A | * | 6/2000 | Azema | .......................... | 483/3 |

FOREIGN PATENT DOCUMENTS

| | | | | | |
|---|---|---|---|---|---|
| JP | 58-120441 | * | 7/1983 | ................. | 483/37 |
| JP | 58-186544 | * | 10/1983 | ................. | 483/67 |
| JP | 5-245552 | * | 9/1993 | ................. | 483/60 |

* cited by examiner

*Primary Examiner*—A. L. Wellington
*Assistant Examiner*—Dana Ross
(74) *Attorney, Agent, or Firm*—Sughrue Mion, PLLC

(57) ABSTRACT

Described herein is an oscillating-drawer device for loading and unloading tools into/from the tool magazine of a machine-tool.

6 Claims, 5 Drawing Sheets

DEVICE FOR LOADING AND UNLOADING TOOLS INTO/FROM THE TOOL MAGAZINE OF A MACHINE-TOOL

BACKGROUND OF THE INVENTION

The present invention relates to any type of machine-tool, machining station or centre or the like of the type comprising:

a support for the piece undergoing machining;

a machining head carrying a rotary spindle, to which there is connected in rotation a tool, said machining head being displaceable in three mutually perpendicular directions with respect to a fixed structure of the machine-tool;

a tool magazine comprising a plurality of seats designed to receive and support respective tools, and at least one protection wall, which separates the working area of the machining head from an external protected area.

Machines of the type referred to above are, for example, used for machining lines, for instance, production lines for engine parts for motor vehicles, such as cylinder heads. In this type of machine, the tool magazine, for instance, in the form of a rotary wheel carrying along its periphery a plurality of tool-bearing seats, is periodically supplied with new tools as replacements for tools that have previously been used, for example, on account of failure or wear, or also following upon the need to change the type of machining operation to be carried out. According to traditional techniques, the operation of replacing one or more tools in the corresponding positions in the tool magazine is performed manually. However, this operation is frequently somewhat inconvenient, on account of the limited spaces available around the magazine, and also entails safety problems for the operator.

SUMMARY OF THE INVENTION

The purpose of the present invention is to overcome the aforesaid drawbacks by enabling loading of a new tool into the tool magazine or unloading of a tool from the magazine with extremely simple, easy and fast operations and with total safety for the operator.

With a view to achieving the above purpose, the subject of the invention is a device for loading and unloading tools into/from the tool magazine of a machine-tool of the type referred to at the beginning of this description, characterized in that the aforesaid protection wall has an opening for access to the working area of the machining head, and in that said device further comprises an oscillating drawer having two walls that are set at an angle to one another and are mounted oscillating on said protection wall between a first position, in which one of said two walls of the drawer obstructs the access opening, and a second position, in which the other wall of the drawer obstructs the access opening, said drawer further comprising receiving and supporting means for a tool, which are arranged between the two aforesaid walls set at an angle to one another, in such a way that, in the aforesaid first position of the oscillating drawer, the aforesaid tool-bearing means are set on the outside of the protection wall, whereas, in the aforesaid second position, the aforesaid tool-bearing means are set on the inside of the protection wall.

Thanks to the above-mentioned characteristic, when the drawer is in its first position, the operator can load, conveniently and in maximum safety, a new tool that is to be loaded into the tool magazine, setting it on the aforesaid tool-bearing means. Once this operation has been carried out, the operator simply has to cause oscillation of the drawer into its aforesaid second position, so as to bring the new tool loaded on the inside of the protection wall, whilst safety of the operator always remains ensured, in so far as the access opening is in any case kept obstructed by the drawer. Once the new tool is on the inside of the protection wall, it is the machining head itself which displaces until it reaches the said new tool, so as to be able to pick it up, then to displace into a position corresponding to a position of the tool magazine in order to deposit the new tool thus picked up in said position in the magazine. In machines of the type described above, the movements of the machining head are of course controlled by an electronic control system. It is equally evident that the machining head is able to pick up a tool from the magazine and bring it onto the tool-bearing means of the oscillating drawer, after said means have been pre-set on the inside of protection wall in an empty condition. Once this operation has been performed, the operator from outside can bring the door back into its extracted position, so as to bring the tool deposited therein onto the outside of the protection wall, where it can be unloaded in complete safety. Of course, there is nothing to rule out the possibility of the machining head, after it has picked up a new tool from the drawer, using it immediately to carry out a machining operation. It is likewise evident that, in order to pick up a tool from the drawer, the machining head must have previously unloaded the tool with which it was equipped in a position of the tool magazine.

BRIEF DESCRIPTION OF THE DRAWINGS

According to a preferred embodiment of the present invention, the aforesaid oscillating drawer is manually controlled. On the side of the drawer, which always remains outside the protection wall, there is preferably provided a handle for gripping. The aforementioned tool-bearing means with which the door is equipped can be made, in a way in itself known, in the form of elastic grippers or clamps, which ensure temporary stable support of the tool until it is clamped by the spindle of the machining head and removed form the said grippers.

Further characteristics and advantages of the present invention will emerge from the ensuing description, with reference to the attached drawings, which are provided purely by way of non-limiting example and in which.

DETAILED DESCRIPTION OF THE INVENTION

Figure 1:
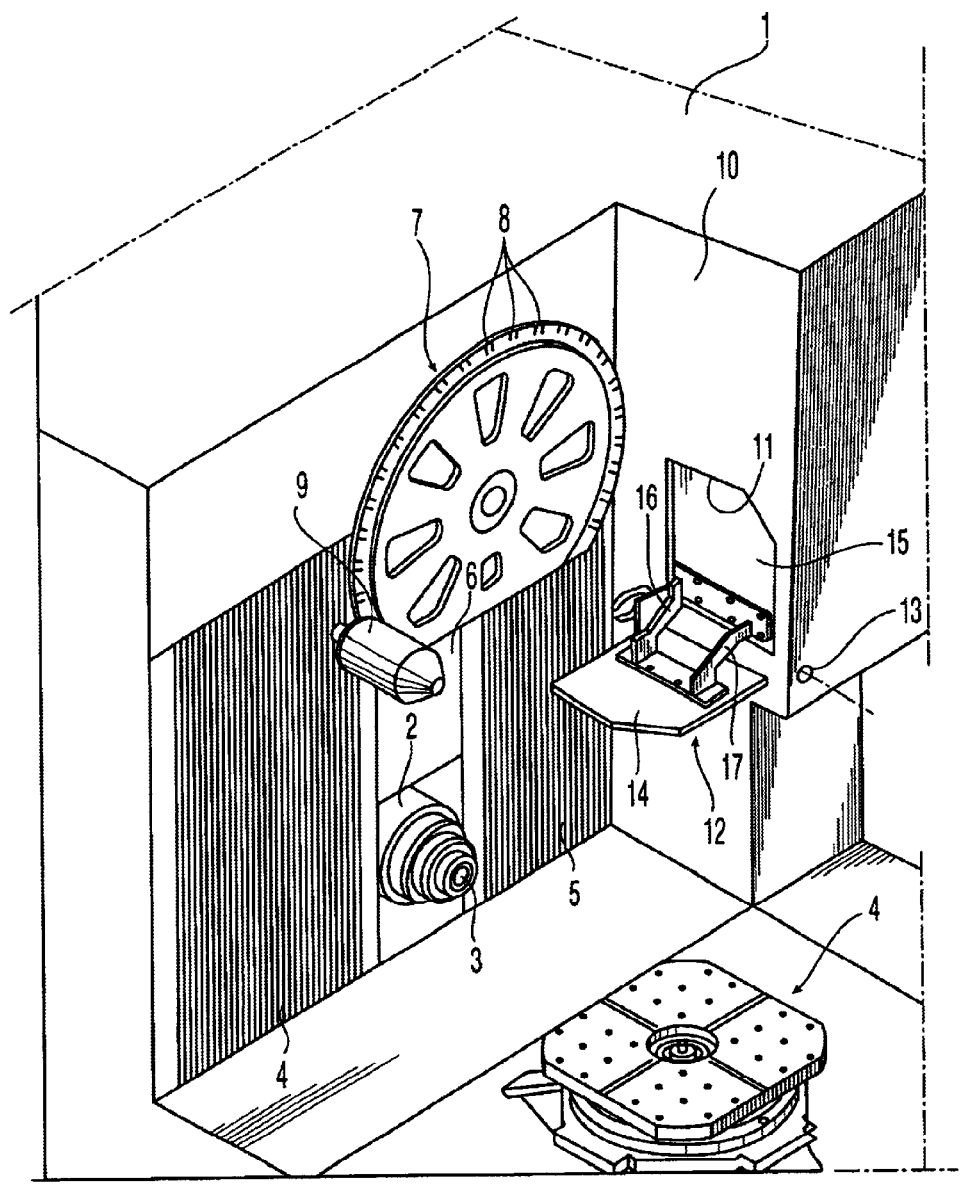
FIG. 1 is a schematic perspective view illustrating the working area of the machining head of a machine tool equipped with a device according to the invention.

In FIG. 1, the reference number 1 designates, as a whole, a machining unit for removal of stock, comprising a machining head 2, which carries a rotating spindle 3, on which a tool is to be connected in rotation. Secured to the fixed structure 1 of the machine, is a workpiece-holding structure 4 of any known type, to which there is to be anchored the piece that is to undergo machining, such as the cylinder head of an internal-combustion engine. According to a technique in itself known, the piece-holding structure 4 can be mounted so that it turns about a vertical axis to enable orientation of the workpiece in a different position at the end of the machining cycle, in order to facilitate picking-up thereof by a transfer structure or a robot designed to load it onto a further machining unit of the production line. The machining head 2 can be displaced with respect to the fixed structure 1 along three mutually orthogonal axes in any known way. In a possible example of embodiment, the machining head 2 can be displaced in a direction parallel to the axis of the spindle on a first slide, which is in turn mounted so that it can slide in a horizontal direction perpendicular to the axis of the spindle on a second slide which is mounted so that it can slide in a vertical direction on the fixed structure 1. However, it is evident that the architecture of the machine-tool may also be different from what is described herein. Furthermore, the aforementioned details of the architecture of the machine are not illustrated herein, both because, as has been said, they do not fall within the scope of the invention, and because they can be made in any known way. In addition, as may be seen in FIG. 1, the machining head 2 is accompanied, throughout its movements, by shutter gates 4, 5, 6, which completely prevent access to the structure of the machine when the latter is in operation.

According to a further characteristic, which is in itself known, there is set, adjacent to the machining area, a tool magazine 7 having a wheel-like conformation, which can turn about a horizontal axis and which carries a plurality of peripheral seats 8 designed to receive and support a respective tool 9. In FIG. 1, purely by way of example, a single tool is schematically illustrated.

The working area of the machining head 3 is rendered completely inaccessible from outside, for reasons of safety, by a series of protective bars (not illustrated in FIG. 1), between which there is comprised a wall 10, which has an opening 11 for access into the working area. Mounted in a position corresponding to the opening 11 is the device according to the invention. This device is constituted by an oscillating drawer 12, which is mounted so that it oscillates about an axis 13 on the structure of the wall 10 and which comprises two plane walls 14, 15, which are mutually orthogonal and consist of metal plates. The two plates 14, 15 are rigidly connected together by brackets 16, 17, which also define the means for receiving and supporting a tool in the oscillating drawer 12.

Figure 2:
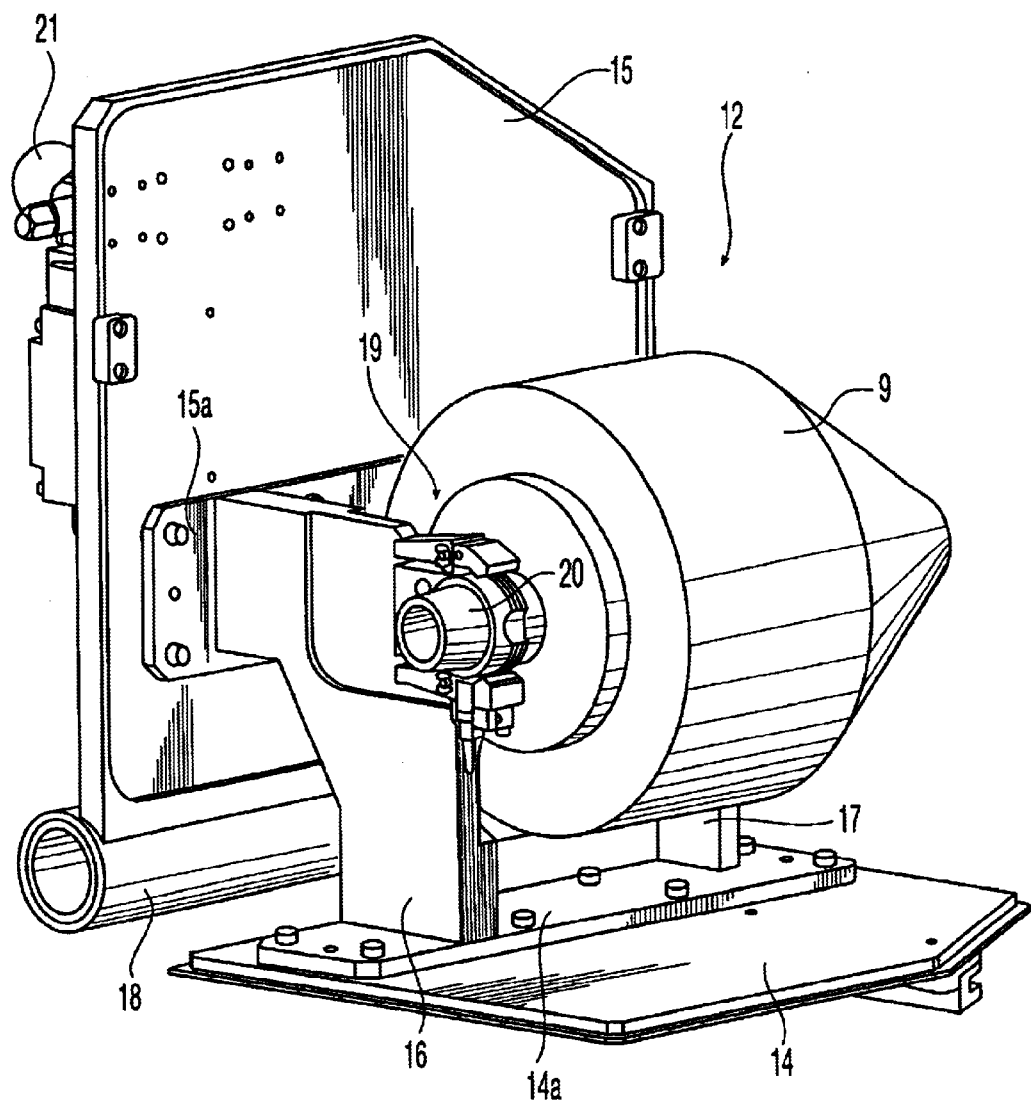
FIG. 2 is a perspective view, at an enlarged scale, of the a device according to the invention, with a tool pre-set on it.

The drawer structure 12 is illustrated, at an enlarged scale and in greater detail, in FIG. 2. As may be seen from FIG. 2, the brackets 16, 17 are secured, for example by means of welding, to two plates 14a, 15a, which are fixed by means of screws to the plates 14, 15. The plate 15 further carries, welded thereto, a bushing 18 designed to be mounted so that it can turn about the shaft carried by the fixed structure of the machine, the said shaft defining the axis of oscillation 13 of the drawer 12. FIG. 2 is a schematic illustration of a tool 9 set in the drawer 12. The tool rests on the bracket 17 and is moreover withheld by an elastic gripper or clamp 19, in itself known, carried by the bracket 16. The tool 9 has a shank 20 provided with means for coupling with the spindle. Also these coupling means are of a type in themselves known and consequently will not be described in further detail herein. On its outer surface, the plate 15 has a knob 21, which functions as a grip.

Figure 3:
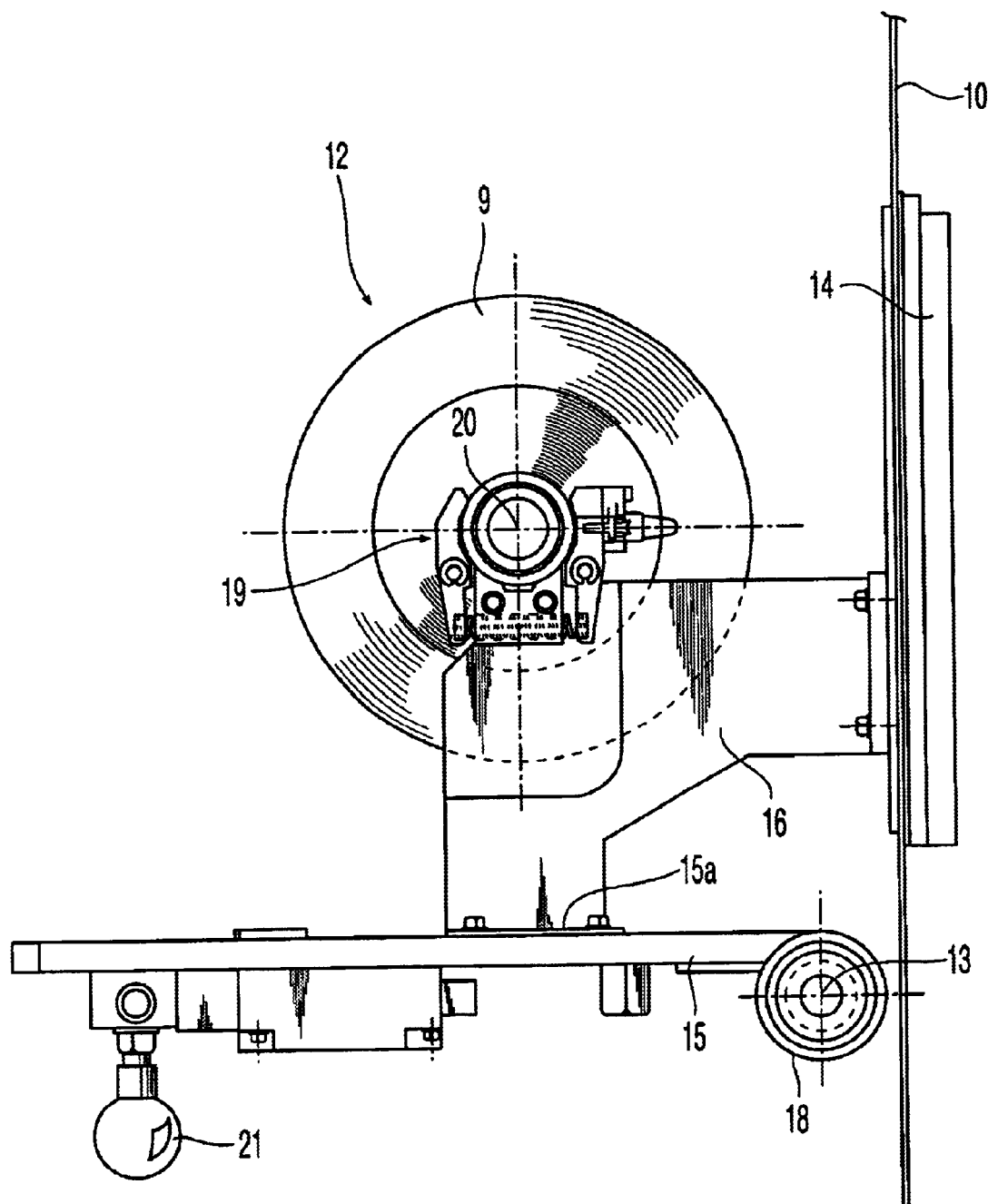
FIG. 3 is a side view of the device of FIG. 2, in a different operating condition.
Figure 4:
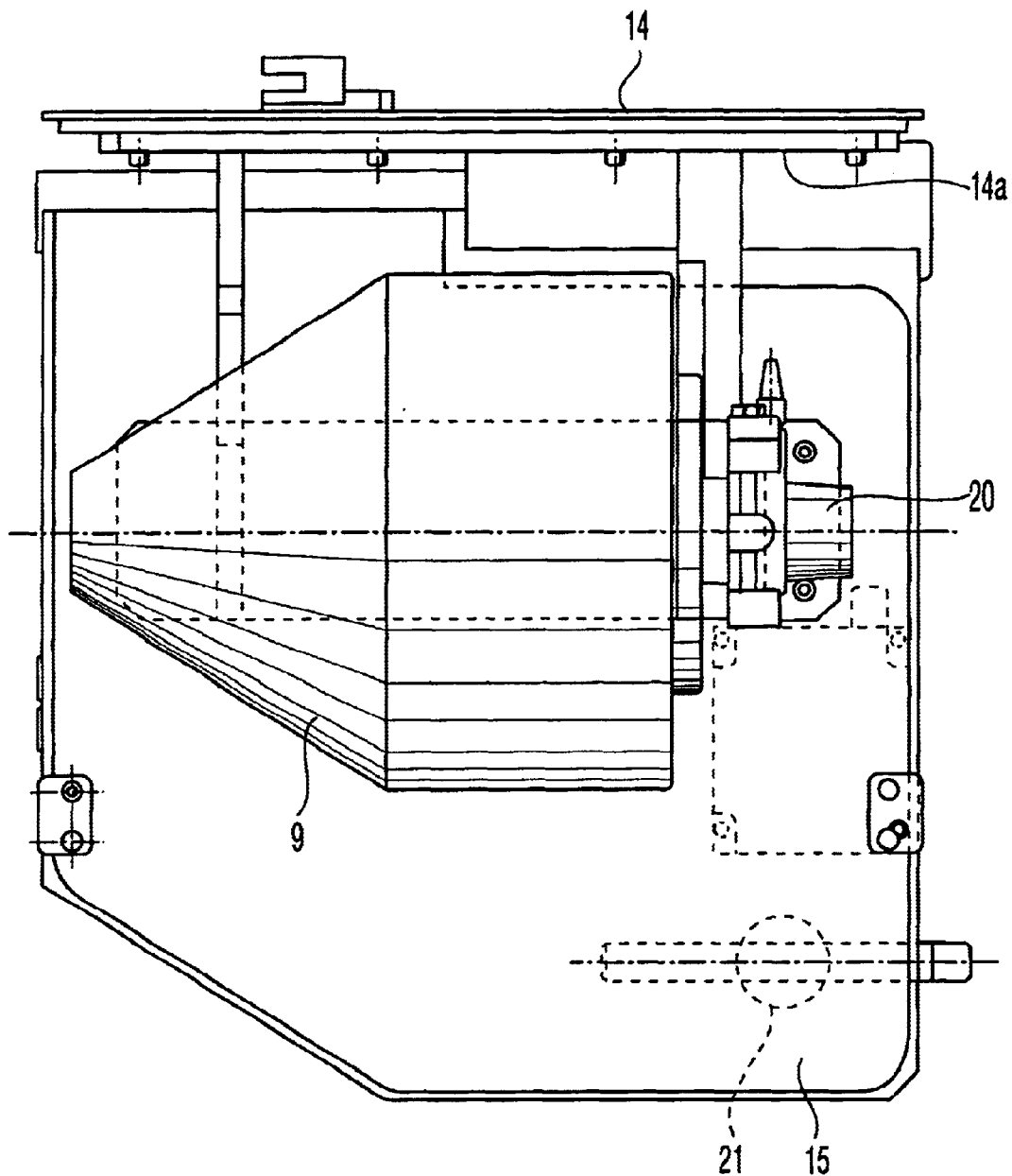
FIG. 4 is a top-plan view of the device in the condition illustrated in FIG. 3.
Figure 5:
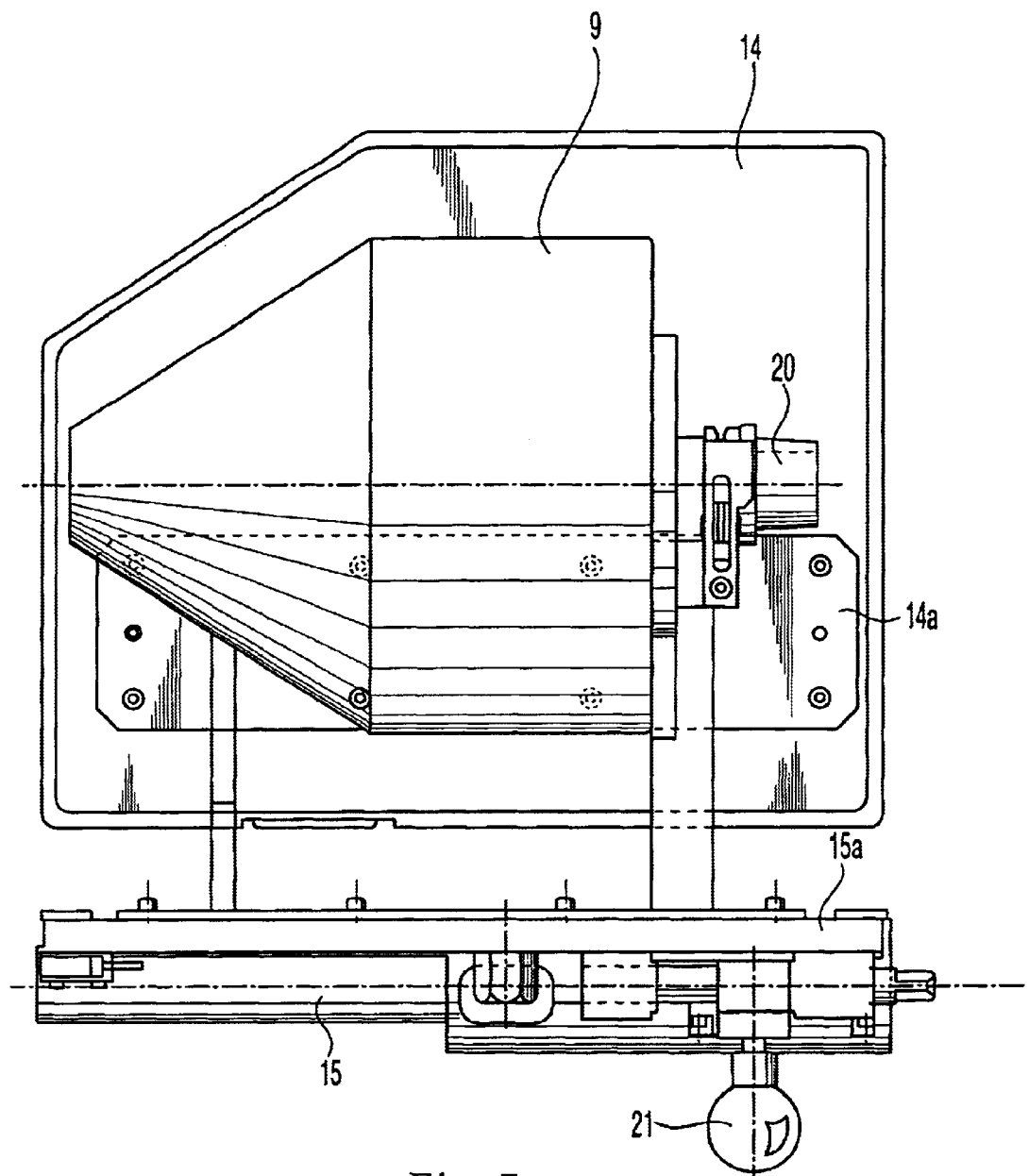
FIG. 5 is the side view of the device in the condition illustrated in FIG. 3.

When it is necessary to load a new tool on the tool magazine 7, the oscillating drawer 12 is pre-set in a first position, which is not the one illustrated in FIG. 1, but rather the one illustrated in FIG. 3. As may be seen in FIG. 3, the access opening 11 to the machining area is obstructed by the wall 14, which bears upon the internal surface of the wall 10. The wall 15 is, instead, on the outside of the wall 10, as likewise the structure of the brackets 16, 17 are on the outside of the wall 10. In this condition, the operator can deposit, conveniently and in complete safety, a tool 9 on the receiving and supporting means represented by the brackets 16, 17 and by the grippers 19. Once the tool 9 has been deposited in the position illustrated in FIG. 3, the operator grips the knob 21 and manually causes a rotation of 90 degrees of the oscillating drawer 12 about the axis 13, so as to bring it into the condition illustrated in FIG. 1 (corresponding to FIGS. 2 and 5). In this condition, the tool, which has previously been loaded on the grippers 19, comes to be inside the working area. The job of picking the tool up from the gripper 19 and carrying it into a position of the tool magazine is entrusted to the machining head 2. This is done, in a way of itself known, by controlled displacement of the machining head and fast coupling of the spindle 3 with the shank 20 of the tool 9. Once coupling is completed, the machining head moves away from the oscillating drawer 12, so causing exit of the shank 20 from the gripper 19. At this point, the machining head can use the tool thus loaded directly for carrying out a machining operation, or else, more probably, unloads the tool that has been picked up into a seat on the tool magazine. In this way, the tool magazine can thus be supplied with new tools, whilst, at the same time, with a succession of operations that is the reverse of the one described above, the machining head can pick up a broken or worn tool from the magazine, and deposit it in the oscillating drawer 12, which has previously been set in the condition illustrated in FIG. 1, after which the operator controls return of the drawer 12 manually from the advanced position to the retracted position illustrated in FIG. 3, where the operator himself, in complete safety, can pick up the broken or worn tool from the gripper 19 and send it to be discarded.

As emerges clearly from the foregoing description, the device according to the invention is characterized by an extreme simplicity and economy of fabrication, but is, at the same time, functional and reliable, as well as guaranteeing maximum operator safety.

Of course, without prejudice to the principle of the invention, the details of construction and the embodiments may vary widely with respect to what is described and illustrated herein purely by way of example, without thereby departing from the scope of the present invention.

What is claimed is:

1. A device for loading and unloading tools into or from the tool magazine of a machine-tool,
    in which said machine-tool comprises:
        a support for the piece undergoing machining;
        a machining head carrying a rotary spindle, to which there is connected in rotation a tool, said machining head being displaceable in three mutually perpendicular directions with respect to a fixed structure of the machine-tool;
        a tool magazine comprising a plurality of seats designed to receive and support respective tools; and
        at least one protection wall, which separates the working area of the machining head from an external protected area,
    wherein said protection wall has an opening for access to the working area of the machining head, and in that said device further comprises an oscillating drawer having a first wall and a second wall that are set at an angle to one another and are mounted oscillating on said protection wall between a first position, in which said first wall of the oscillating drawer obstructs the access opening, and a second position, in which the second wall of the oscillating drawer obstructs the access opening, said drawer further comprising receiving and supporting means for a tool, which are arranged between the first and second walls set at an angle to one another, in such a way that, in the aforesaid first position of the oscillating drawer, the aforesaid tool bearing means are set on the outside of the protection wall, and in the aforesaid second position, the aforesaid tool-bearing means are set on the inside of the protection wall.

2. The device according to claim 1, wherein said walls set at an angle to one another consist of plane metal plates which are set perpendicular to one another and are joined together by brackets, which define the aforesaid tool-bearing means.

3. The device according to claim 2, wherein at least one of said brackets carries an elastic gripper for clamping the shank of a tool.

4. The device according to claim 3, wherein the structure of said oscillating drawer, comprising the two metal plates and the brackets which join them together, further incorporates a bushing for mounting the drawer, so that it can oscillate, on the aforesaid protection wall.

5. The device according to claim 1, wherein the aforesaid oscillating drawer is manually controlled, and in that said second wall of the oscillating drawer is provided on the outside with a grip.

6. The device according to claim 1, wherein, in the aforesaid first position, said first wall of the oscillating drawer bears upon the internal surface of the aforesaid protection wall, and in the aforesaid second position, said second wall bears upon the external surface of the aforesaid protection wall.

* * * * *